June 2, 1925. 1,540,058
G. W. COLLIN
AUTOMATIC THERMOSTATIC AND TIME CONTROLLED DEVICE
Filed July 15, 1922 3 Sheets-Sheet 1

INVENTOR.
George W. Collin
BY
Chamberlain & Newman ATTORNEYS.

June 2, 1925.

G. W. COLLIN 1,540,058

AUTOMATIC THERMOSTATIC AND TIME CONTROLLED DEVICE

Filed July 15, 1922 3 Sheets-Sheet 3

INVENTOR.
George W. Collin
BY
Chamberlain + Newman ATTORNEYS.

Patented June 2, 1925.

1,540,058

UNITED STATES PATENT OFFICE.

GEORGE W. COLLIN, OF BRIDGEPORT, CONNECTICUT.

AUTOMATIC THERMOSTATIC AND TIME CONTROLLED DEVICE.

Application filed July 15, 1922. Serial No. 575,395.

*To all whom it may concern:*

Be it known that GEORGE W. COLLIN, a citizen of the United States, and resident of Bridgeport, in the county of Fairfield and State of Connecticut, has invented certain new and useful Improvements in Automatic Thermostatic and Time-Controlled Devices, of which the following is a specification.

The present invention relates to an automatic thermostatic and time controlled device, particularly for controlling the supply of steam to heating chambers, such as used for instance in vulcanizing, dyeing, bleaching and similar processes. The invention comprises a novel form of thermostatic control device whereby the supply of steam may be cut off at a regulated pre-determined temperature, and again supplied at a falling off of such temperature; and time controlled means for continuing the process for a pre-determined period, and finally cutting off the supply of steam, and blowing off or discharging the steam from the heating chamber.

An object of the invention is to provide a device of this character, which will be simple, reliable and efficient in operation, and in which the pre-determined temperature and timed relation may be regulated with precision.

The invention is adapted particularly for use, with the class of thermostatic control devices shown and described in my Patents #1,360,251 of November 23, 1920, and #1,410,658 of March 28, 1922, and to this extent may be said to be an improvement upon such devices. In these devices, provision is made for the distant control of a heating fluid through heating pipes and the like, and employing a control valve having a thermostatic couple for operating the same, together with an adjustable device whereby the action of the control valve may be effected at various degrees of heat.

A further object is to provide for the automatic timed control of the temperature at which the cut-off and supply valve will operate, so that the device may be operated for a pre-determined period at a rising or decreasing temperature, or if desired for a time at a given temperature.

With the above and other objects in view, an embodiment of the invention is shown in the accompanying drawings, and this embodiment will be hereinafter more fully described with reference thereto, and the invention finally pointed out in the claims.

In the drawings.

Similar reference characters indicate corresponding parts throughout the several parts of the drawings.

Figure 1:
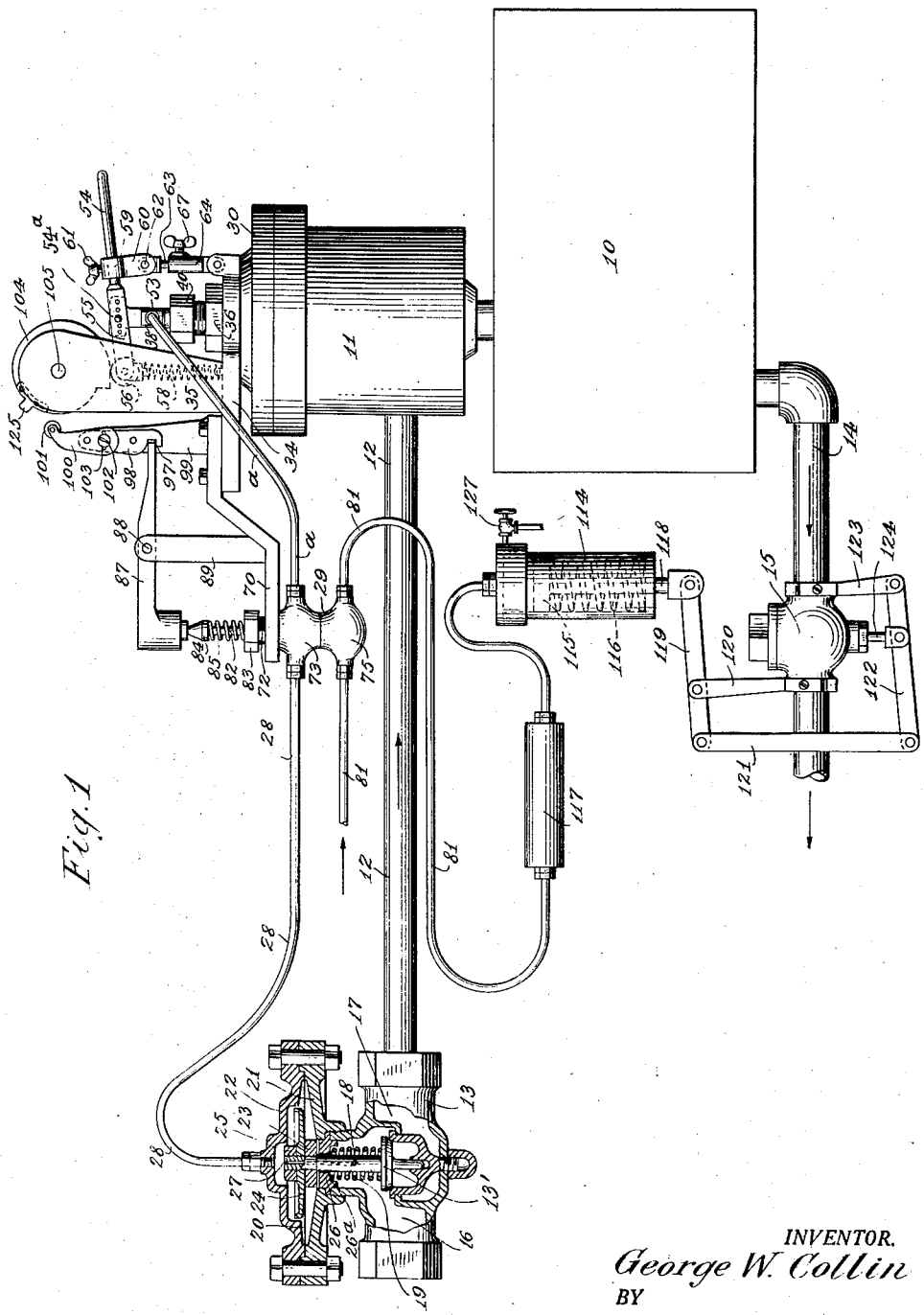
Fig. 1 is a view, in elevation of the complete automatic control apparatus.
Figure 2:
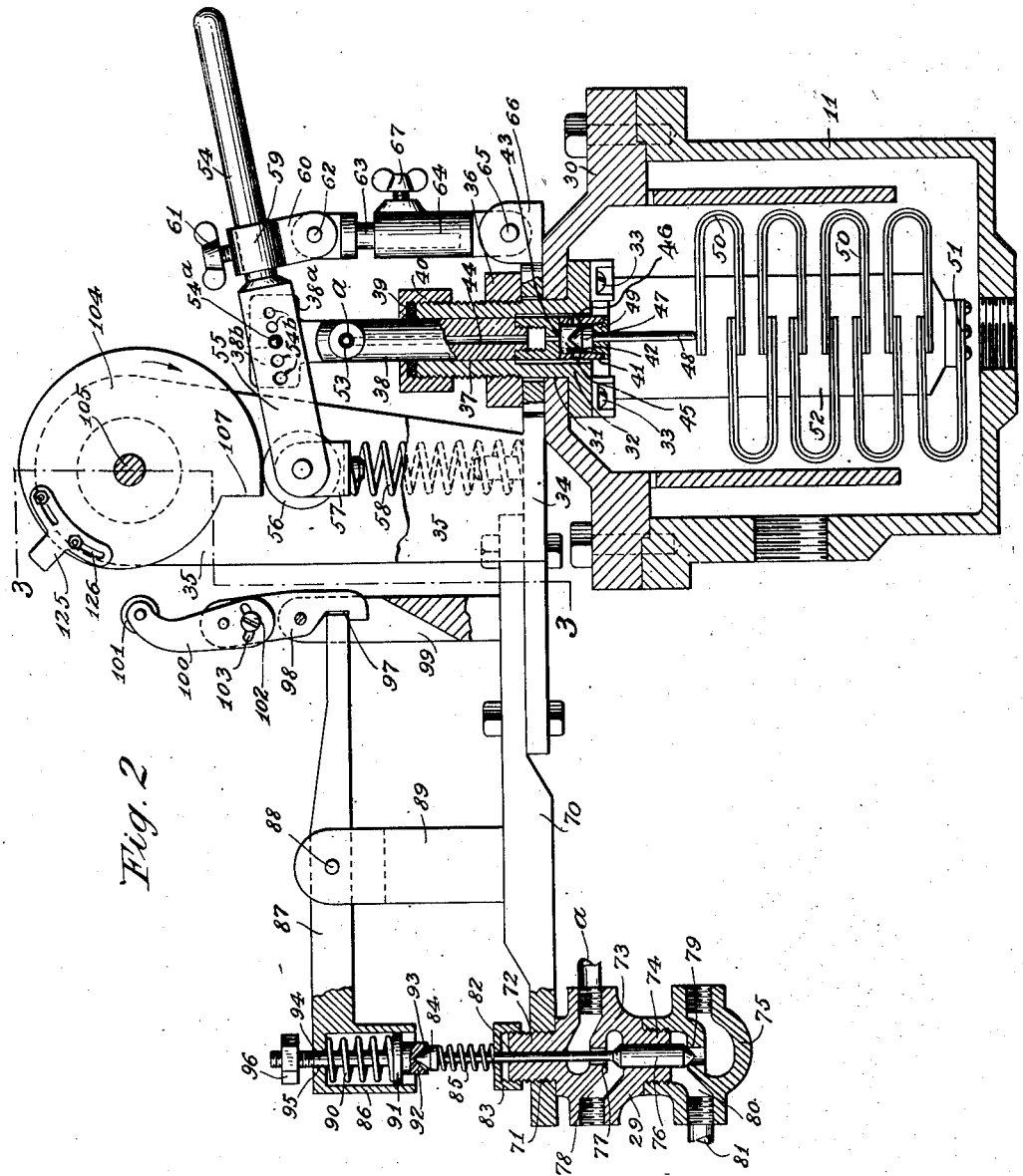
Fig. 2 is a detail view, partially in vertical section, and partially in elevation of the thermostatic valve for controlling the supply of steam, and the timing mechanism, for finally cutting off such supply and operating the blow-off device.

Referring particularly to Figs. 1 and 2 of the drawings, the steam process chamber 10 is provided with an auxiliary steam thermostat housing chamber 11, to which steam is supplied through a pipe 12 extending from a main control valve 13. A steam blow-off or discharge pipe 14 is connected to the lower end of the chamber 10 and is provided with a blow-off valve 15, hereinafter more fully referred to.

The inlet valve 13 (illustrated in its closed position) is similar to that disclosed in my Patent #1,410,658, and comprises an inlet 16 and an outlet 17, to which latter the pipe 12 is connected in a manner to pass steam through the valve when the latter is opened. A valve member 13' is positioned in the body of the valve 13, and carries a valve stem 18, upon which a spring 19 is mounted, and which normally holds the valve member 13' down to close the valve passage. A diaphragm 20 has its edge portion clamped between the upper flanged portion 21, secured to the body, and a cover plate 22, the central portion of the diaphragm being secured to the valve stem by being clamped between plates 23 and 24 secured by a nut 25.

The flanged portion 21 secures in place a guide hub 26 for the valve stem, the guide passage 26ª therethrough being slightly larger than the stem to admit steam below the diaphragm. The upper side of the diaphragm is in communication with the valve interior through a passage 27 extending through the valve stem, and which builds up initial pressure above the diaphragm, when the rest of the system is closed, to force the diaphragm down and close the valve.

The steam chamber above the diaphragm is connected by a pipe 28 to the thermostatic control, and in which pipe there is provided a duplex valve 29, for finally cutting off the supply of steam and operating the blow-off or discharge, as will be later more fully pointed out.

The auxiliary steam chamber 11 is provided with a cover plate 30 having a central opening 31 therein, into which a flanged sleeve 32 is positioned from the inside, and held by screws 33. The upwardly extending end of the sleeve is threaded and the apertured end of the base plate 34 of the frame 35 is fitted therein and secured by a nut 36. The sleeve is provided with a central longitudinal bore 37 to accommodate an adjustable tubular post 38 carried therein.

The post 38 is supported in the hollow sleeve 32 and a packing 39 is clamped between the top end of the sleeve and a nut 40 in a manner to prevent the escape of steam around the post. The post is thus adapted to be adjusted longitudinally by means of the adjusting device later to be described. A detachable extension 41, having therein a valve chamber 42 and a valve seat 43 is threaded on the lower end of the post. The valve chamber in this extension connects with the longitudinal steam passage 44 extending up in the post, and is further provided with steam ports 45 and 46, that form passage from the said valve chamber to the above mentioned steam chamber 11, in which the lower extension of the post is positioned. A control valve 47 is provided with a stem 48, that extends out through a hole in a closure cap 49 in the lower end of the extension.

The lower end of the valve stem 48 is adapted to be engaged by the upper end of an expansible thermostat 50, supported at 51 upon a hanger 52 suspended from the under side of the cover 30. The steam passage 44 is in communication with the pipe 28 by connection at 53.

The auxiliary control valve 47 is shown in Fig. 2 in open position and is adapted to be closed by the expansion of the thermostat, due to excessive heat in the steam chamber 10, and in the thermostat housing auxiliary chamber 11 in communication therewith. The degree of heat necessary to bring about the closing of the valve may be regulated by adjusting the tubular post and its valve in respect to the contacting end portion of the thermostat 50, through the mechanism mounted on the outside of the chamber, which will be hereinafter more fully described. This regulation may be fixed, in order to maintain a given temperature, or it may be automatically controlled to provide increasing or decreasing temperatures, during one or more timed periods, or varied temperatures during timed periods, remaining constant during the respective periods.

To the upper end of the post 38 there is secured a lever arm 54, having a forked portion 55, provided with a roller 56, and a block 57 pivotally hung therefrom, between which and the base 34 there is provided a coil spring 58. The lever is engaged in the adjustable sleeve 59 of a link 60 by a set screw 61, the link being pivotally connected at 62 to the upper end of a post 63, adjustable vertically in a sleeve 64, pivotally mounted at 65 upon a lug 66 formed upon the base 34, and adapted to be fixed in the adjusted position by a set screw 67.

The post 38 is provided with a T-head 38$^a$, having a series of holes 38$^b$ therein, and is pivotally connected to the lever 54 by a removable pin 54$^a$, engaged in one of said holes through registering holes 54$^b$ of the lever 54. By changing the position of the pin in the holes relatively to the fulcrum formed by the control connection 62, the effective operation of the lever and the relative raising and lowering of the post 38 may be regulated.

A timing cam 104, having its periphery engaged by the roller 56 through the action of the spring 58, is mounted on a shaft 105 in the frame 35, and is turned by a clockwork mechanism 106 (Fig. 3), so that, depending upon the contour of the cam the post may be raised or lowered at a predetermined rate over a given period, thereby causing the temperature in the chamber 10 to be gradually increased or decreased as desired. As shown in the present embodiment, the movement of the cam in clockwise direction, starting with the roller 56 at the high point 107, will cause a gradual rise in temperature, the stem 48 of the control valve 47 being steadily lifted with relation to the thermostat, to steadily elevate the temperature at which the valve 47 will be closed. It will be understood that the cam may be of any desired shape to cause either a gradual increase or decrease of temperature, a succession of periods of different temperatures, or a constant temperature during the complete cycle.

In addition to the adjustment afforded by the pin 54$^a$, the effective operation of the lever 54 may also be regulated by adjusting the sleeve 59 thereon, adjustment to the left resulting in a decrease in the rise of temperature and adjustment to the right resulting in an increase in the rise of temperature in the same period of time.

Here we have an adjustment intermediate the post 38 and the timing cam, the lever pivoted to the post at 54$^a$, carrying the wheel 56 that contacts with the cam, and also the adjustable sleeve 59, on the round section of the lever 54 pivoted at 62 to the adjustable post 63 and pivoted below to the bracket 66. By moving these adjustable elements the control can be set to start the process operation at any temperature desired as for instance if the process calls for 90° rise in temperature in two hours, the sleeve 59 is set as in the drawing, on the other hand by sliding sleeve 59 to the right to the limit, the post being pivoted at 54ª to the lever in the center hole in the head of the post, we will get 100° rise in two hours. If even a greater range than this is desired, it is attained by changing the pivot 54ª of the post to the lever; whereby we can obtain approximately from 30° rise in temperature in two hours, or 150° rise in two hours.

Furthermore—this differential setting of the elements between the post and the cam enables the use of one element 104 for any service requiring the same kind of treatment, within the length of time limit of the complete revolution of the cam.

Fig. 2 shows the apparatus in position for the beginning of the operation, the valve 47 being open, which relieves the pressure from above the inlet valve in a manner to allow initial pressure under the diaphragm to lift it and the valve 13′, and permit passage of steam through the pipe 12 to the chamber 10.

The operation of the device thus far is as follows:—

The steam passes through the intake valve 13, when the main valve member 13′ is raised which fills and heats the chamber 10, causing the thermostat 50 to expand, and at a predetermined point to engage and raise the valve stem 48 and control valve 47, and close the passage 44. This causes the main steam pressure to build up in the chamber, above the diaphragm 20 of the main valve (Fig. 1), through the port 27, in a manner to depress the diaphragm, close the main valve, and cut off the steam supply to the heating chamber. On the other hand, when the temperature in the heating chamber drops sufficiently, the thermostat will contract and open the port 44 in a manner to relieve the pressure above the diaphragm 20 and permit the normal greater pressure on the underside of the diaphragm to again open the inlet valve.

The timing control for finally shutting off the steam supply and operating the blow-off or discharge device will now be described.

A bracket 70 is bolted to the extended end of the base 34 of the frame 35, and is provided at its outer end with a threaded hole 71, into which is screwed the threaded neck 72 of the upper part 73 of the duplex valve 29. The part 73 of the valve has a threaded extension 74, to which the lower part 75 is screwed, the double valve head 76 being first installed in the chamber. In its raised position, the valve 76 seats at 77 to close the passage 78 through the valve part 73, and thereby stop the passage of steam through the pipe 28, which causes the main supply valve to be closed in a similar manner to the control by the thermostat, as before described. At the same time, the valve is lifted from the seat 79 to open the passage 80 through the valve part 75, which allows steam to pass through a pipe 81 connected thereto, to operate the blow-off device, as will be hereinafter more fully described.

The valve 76 has a stem 82, extending through the neck, and a gland nut 83 secured to the upper end of the neck, and terminates in a cone-shaped head 84, screwed on the end of the stem, a spring 85 being interposed between the head and gland-nut and which tends to lift the valve.

Above the head 84, there is disposed the outer cylindered end 86 of a lever 87, pivotally mounted at 88 in the slotted end of an upright post 89, formed upon the bracket 70.

Within the cylindered end 86, there is chambered a coiled spring 90, and a ring 91 loosely fits the cylinder. A hub 92 is formed integral with the ring, and is provided with a conical recess 93, engaged by the conical head 84 of the valve stem. A guide stem 94 extends upwardly from the ring, through a guide opening 95 in the top of the cylinder and to the end of which a nut 96 is screwed to prevent the spring from forcing the ring out of the cylinder. The tension of the spring 90, being greater than that of the spring 85, the latter will not tend to lift the valve until the lever 87 is free to pivot. The chambered spring 90 is in the nature of a dash-pot, permitting of a fixed condition of the lever 87, and a yieldable condition of the valve to insure tight closure thereof without jamming.

The inner end of the lever 87 is engaged and held in the notched end 97 of a dog 98 when the valve is set for service. The dog 98 is pivotally mounted in an upright post 99 of the bracket 70, and is provided with a pivotally adjustable extension 100, having a roller 101 at its upper end, and adapted to be fixed in its adjusted relation by a set screw 102, engaging an arcuate slot 103 thereof.

The timing cam 104 has mounted thereon a trip member 125, adjustable circumferentially on the cam by slot and screw connection 126, and adapted, after a predetermined period of operation of the apparatus, to engage the rollered end of the dog 98, tripping it, and releasing the lever 87, permitting the valve 76 to rise under the influence of its spring 85, thereby closing the valve passage 78 and opening the valve passage 80.

Figure 3:
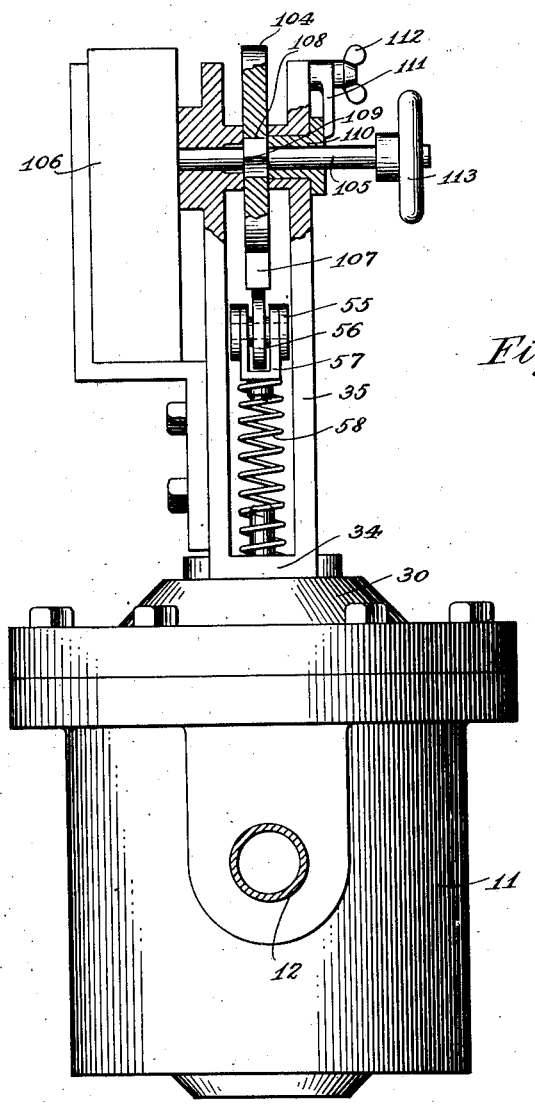
Fig. 3 is a vertical sectional view along line 3—3 of Fig. 2, and showing the interchangeable cam detail.

As shown in Fig. 3, the cam 104 is readily interchangeable, being provided with a squared opening 108, in which is engaged a square section 109 of the shaft 105, which is held in place by a flanged collar 110, secured by a swing-lock 111 and a wing-nut 112. By disengaging the swing-lock, the collar and shaft may be readily removed and another cam inserted. A hand-wheel 113 is provided at the end of the shaft for setting the cam.

The blow off control pipe 81, through which high pressure steam is admitted by the valve 75, is connected to a piston cylinder 114, in which a piston 115 reciprocates, being normally moved to its raised position by a spring 116. Between the valve 75 and the cylinder, a chamber 117 is provided below the level of the top of the cylinder, and in which water is chambered by condensation, so that water always comes into contact with the piston 115 to drive it down.

The piston rod 118 is pivoted at one end to a bar 119, pivoted in a bracket 120, and having its other end connected by a link 121 to a bar 122, pivoted at its end to a bracket 123, and having pivotally secured thereto the end of the valve stem 124 of the valve 15.

When steam is admitted to the chamber 117, the water therein is forced against the piston 115, depressing it, and through the leverage 119, 121 and 122, lifting the valve stem 124 to open the blow-off valve 15 to discharge the steam from the heating chamber 10.

When the valve 75 is again closed by the manual setting and engagement of the lever 87 with the notched end of the dog 98, the spring 116 expands, raising the piston, a bleeder-needle-valve 127, connected to the head of the cylinder 114, permitting the discharge of the pressure above the piston, which, upon return to its raised position, closes the blow-off valve. The apparatus is again ready for service.

I have illustrated and described a preferred and satisfactory embodiment of the invention, but it is obvious that changes may be made therein within the spirit and scope thereof, as defined in the appended claims.

I claim:

1. In a control device, the combination with a heating chamber and a supply pipe, of an inlet valve therefor having a fluid-pressure actuated diaphragm, a fluid-pressure conduit between said heating chamber and said diaphragm, of a thermostatically operated control valve for said fluid-pressure conduit in proximity to the heating chamber, a thermostat within the heating chamber for directly operating the valve by the rise and fall of temperature in the heating chamber, and automatic regulating means for determining the temperature at which said control valve will operate.

2. In a control device, the combination with a heating chamber and a supply pipe, of an inlet valve therefor having a fluid-pressure actuated diaphragm, a fluid-pressure conduit between said heating chamber and said diaphragm, of a thermostatically operated control valve for said fluid-pressure conduit in proximity to the heating chamber, a thermostat within the heating chamber for directly operating the valve by the rise and fall of temperature in the heating chamber, and automatic timing means for regulating the period at which the heating chamber will be supplied with heating fluid at a given temperature.

3. In a control device, the combination with a heating chamber and a supply pipe, of an inlet valve therefor having a fluid-pressure actuated diaphragm, a fluid-pressure conduit between said heating chamber and said diaphragm, of a thermostatically operated control valve for said fluid-pressure conduit in proximity to the heating chamber, a thermostat within the heating chamber for directly operating the valve by the rise and fall of temperature in the heating chamber, an auxiliary valve in said conduit, and time-controlled means adapted to operate said valve at the end of a predetermined period to close said conduit.

4. In a control device, the combination with a heating chamber and a supply pipe, of an inlet valve therefor having a fluid-pressure actuated diaphragm, of a conduit connecting said heating chamber and diaphragm and permitting the passage of fluid from one side of the diaphragm to maintain the inlet valve open, a valve in said conduit, and time-controlled means adapted to operate said valve at the end of a predetermined period to close said conduit.

5. In a control device, the combination with a heating chamber, a supply pipe and a discharge pipe, of a fluid-actuated inlet valve for said supply pipe, a fluid-actuated blow-off valve for said discharge pipe, a duplex valve having a single valve stem adapted to control the fluid-pressure to said inlet valve and said blow-off valve to close the inlet valve and open the blow-off valve, and time-controlled means adapted to operate said duplex valve at the end of a predetermined period.

6. In a control device, the combination with a heating chamber and a supply pipe, of an inlet valve therefor having a fluid-pressure actuated diaphragm, a conduit connected at one side of the diaphragm and extending to said heating chamber, a non-thermostatic control valve in said conduit, means adapted to normally close the valve, a latch device adapted to maintain said valve open, and time-controlled means for releasing said latch device at the end of a predetermined period.

7. In a control device, the combination with a heating chamber and a supply pipe, of an inlet valve therefor having a fluid-pressure actuated diaphragm, a conduit connected at one side of the diaphragm and extending to said heating chamber, a non-thermostatic control valve in said conduit, means adapted to normally close the valve, a latch device adapted to maintain said valve open, a cam for operating said latch device, and clock-work mechanism adapted to turn said cam to release said latch device at the end of a predetermined period.

8. In a control device, the combination with a heating chamber, a steam supply pipe, a steam discharge pipe, and inlet valve for said supply pipe, a blow-off valve for said discharge pipe, a fluid-actuated piston adapted to actuate said blow-off valve, a steam conduit in communication with said piston, a valve in said conduit adapted to be opened to admit steam to said conduit, and condensation water chambering means in said conduit between the piston and the valve, whereby the condensation water is collected to provide a water seal and the piston is actuated by water pressure impelled by steam.

9. In a control device, the combination with a heating chamber and a supply pipe, of an inlet valve therefor, thermostatically operated means adapted to control said valve to maintain a given temperature in said chamber, and including a control cam, a thermostat, a controlling member for said inlet valve adjustable with relation to said thermostat, and actuating means between said cam and said member, comprising a lever arm connected to said member to impart movement thereto and movable by said cam to adjust said member, and means for shifting the fulcrum point to adjust the effective movement of said lever arm.

10. In a control device, the combination with a heating chamber and a supply pipe, of an inlet valve therefor, thermostatically operated means adapted to control said valve to maintain a given temperature in said chamber, and including a control cam, a thermostat, a controlling member for said inlet valve adjustable with relation to said thermostat, and actuating means between said cam and said member, comprising a lever arm engaging said cam at one end, a vertically adjustable pivotally mounted fulcrum support at its other end, and a pivoted connection with said controlling member intermediate said ends.

11. In a control device, the combination with a heating chamber and a supply pipe, of an inlet valve therefor, thermostatically operated means adapted to control said valve to maintain a given temperature in said chamber, and including a control cam, a thermostat, a controlling member for said inlet valve adjustable with relation to said thermostat, and actuating means between said cam and said member, comprising a lever arm engaging said cam, an adjustable fulcrum therefor comprising a vertically extensible member pivotally connected to said lever arm, and a pivoted connection with said controlling member.

12. In a control device, the combination with a heating chamber and a supply pipe, of an inlet valve therefor, thermostatically operated means adapted to control said valve to maintain a given temperature in said chamber, and including a control cam, a thermostat, a controlling member for said inlet valve adjustable with relation to said thermostat, and actuating means between said cam and said member, comprising a lever arm engaging said cam, an adjustable fulcrum therefor comprising a vertically extensible member pivotally connected to said lever arm, said pivotal connection being adjustable longitudinally of said lever arm, and a pivoted connection with said controlling member.

13. In a control device, the combination with a heating chamber and a supply pipe, of an inlet valve therefor, thermostatically operated means adapted to control said valve to maintain a given temperature in said chamber, and including a control cam, a thermostat, a controlling member for said inlet valve adjustable with relation to said thermostat, and actuating means between said cam and said member, comprising a lever arm engaging said cam, a fulcrum therefor having its fulcrum axis movably mounted for lateral movement, and a pivoted connection with said controlling member adjustable longitudinally of said lever arm.

Signed at Bridgeport in the county of Fairfield and State of Connecticut this 12th day of July, A. D. 1922.

GEORGE W. COLLIN.

Witnesses:
C. M. NEWMAN,
BERTA K. HALLAM.